Patented Apr. 19, 1932                                                              1,854,195

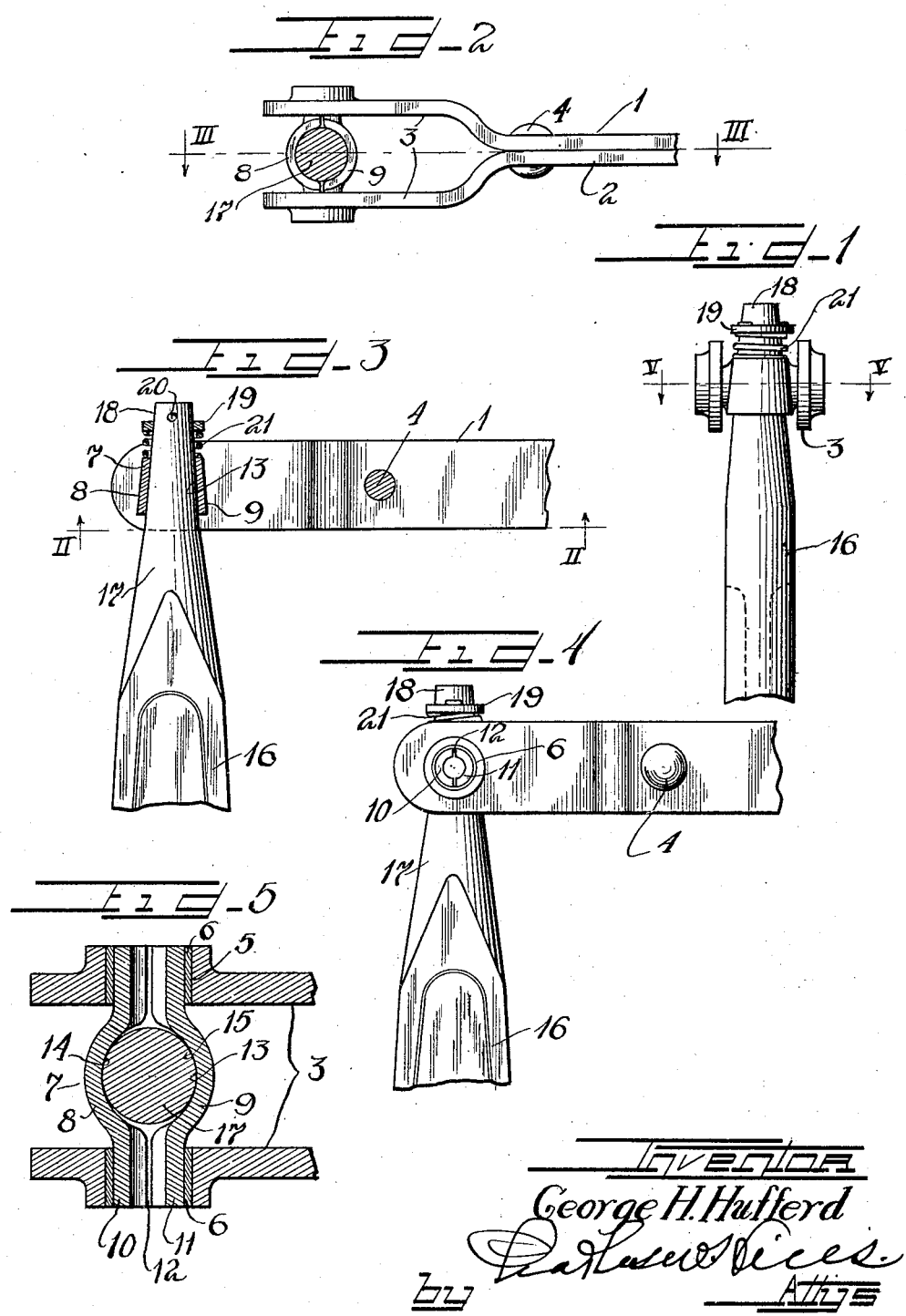

UNITED STATES PATENT OFFICE

GEORGE H. HUFFERD, OF DETROIT, MICHIGAN, ASSIGNOR TO THOMPSON PRODUCTS, INCORPORATED, OF CLEVELAND, OHIO, A CORPORATION OF OHIO

CONNECTION

Application filed December 20, 1929. Serial No. 415,398.

This invention relates to a connection and more particularly to a connection of a semi-universal type for use in shock absorber linkages and the like.

It is an important object of this invention to provide a simple connection that can be economically manufactured, which shall have sufficient universality of movement for use in shock absorber linkages and the like.

Other and further important objects of this invention will be apparent from the disclosures in the specification and the accompanying drawings.

This invention (in a preferred form) is illustrated in the drawings and hereinafter more fully described.

On the drawings:

Figure 1 is an end elevational view of a connection embodying the principles of my invention.

Figure 2 is a sectional view taken substantially on the line II—II of Figure 3.

Figure 3 is a sectional view taken substantially on the line III—III of Figure 2 with parts in elevation.

Figure 4 is a side elevational view.

Figure 5 is an enlarged sectional view taken substantially on the line V—V of Figure 1.

As shown on the drawings:

The reference numeral 1 indicates a link, which, as shown, may be conveniently formed from stamped pieces of metal to provide a body portion 2 and a bifurcated end portion or yoke 3, the halves of said link being secured together by means of rivets 4 or the like. The bifurcated end, or yoke 3, is provided with axially alined spaced openings 5 for receiving bearings 6 suitably formed of bronze or phosphor bronze.

A split trunnioned member 7 is rotatably mounted in said alined bearings 6. Said trunnioned member 7 comprises symmetrically stamped portions 8 and 9 having slightly less than semi-cylindrical ends 10 and 11, respectively, which extend into the bearings 6. There is thus left a small space 12 between the respective ends 10 and 11, for a purpose that will later appear. The stampings 8 and 9 are formed with symmetrically arranged, substantially semi-conical recesses 14 and 15, which together form a tapered seat 13, the axis of which is normal to the axis of the bearings 6. Said symmetrical recess portions 14 and 15 do not have a common axis but their respective axes lie on opposite sides, respectively, of the central axis, this for a purpose that will later appear.

A second link 16 having a tapered portion 17 is associated with said link 1, with its tapered portion 17 rotatably mounted in the seat 13 and its end 18 extending therebeyond. Although the tapered portion 17 has the same taper as the seat 13, the surface of said portion 17 is truly conical, that is, a cross section is a true circle. It is therefore apparent, in view of the above description of the seat 13, that line contact, rather than surface contact, is established between said tapered end 17 and the seat 13 (Figure 5). This provision of line contact between the two surfaces prevents excessive friction and possible binding of the tapered portion 17 in the seat 13.

A washer 19 is secured upon the extended end 18, as by means of a pin 20, and a spring 21 is positioned upon said extended end and held there under compression between said washer 19 and the trunnioned member 7. As the spring 21 is held under compression, it tends to urge the tapered end 17 into close contact with the seat 13 and also at the same time to spread apart the trunnion members 8 and 9 to contact at their respective ends 10 and 11 with the bearings 6. Said spring 21 thus serves to take up wear not only between the tapered end 17 and the seat 13 of the trunnioned member 7 but also between the trunnion ends 10 and 11 and the bearings 6.

A linkage such as above described is especially suitable for use in connection with shock absorbers, since it may be easily and cheaply manufactured and since it automatically compensates for wear and takes up play in the bearing joints. It is apparent that such a linkage provides a limited universality of movement, in that the link 16 is both rotatable about its own axis within the seat 13 and also rotatable with the trunnioned member 7 about the axis of the bearings 6.

Furthermore, the link 16 is capable of limited movement in line with its axes due to the resiliency of the spring 21.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A connection comprising a bifurcated member, a second member having a tapered end, a split member provided with trunnions, said trunnions being journalled in said bifurcated member and providing a tapered bore for receiving said tapered end and resilient means urging said tapered end into said bore and tending to spread said split member.

2. In combination, a pair of spaced bearings, a split member trunnioned therein affording a tapered seat having an axis normal to the axis of the bearings, a tapered member rotable in said seat and means tending to urge the tapered member into contact with its seat and the split member into contact with the bearings.

3. In combination, a link having a bifurcated end, axially alined spaced bearings in said bifurcated end, a split member trunnioned in said bearings and affording a tapered seat having its major axis normal to the axis of said bearings, a second link having a tapered end extending through said seat and rotable therein and means on the extended tapered end of said second link tending to urge the tapered end into contact with its seat and said split member into contact with the bearings.

4. In combination, a link having a bifurcated end, axially alined spaced bearings in said bifurcated end, a split member trunnioned in said bearings and affording a tapered seat having its major axis normal to the axis of said bearings, a second link having a tapered end extending through said seat and rotable therein and resilient means on the extended tapered end of said second link tending to urge the tapered end into contact with its seat and said split member into contact with the bearings.

5. In combination, a link having a bifurcated end, axially alined spaced bearings in said bifurcated end, a split member trunnioned in said bearings and affording a tapered seat having its major axis normal to the axis of said bearings, a second link having a tapered end rotable in said seat and having line contact therewith and means tending to urge the tapered member into contact with its seat and the split member into contact with the bearings.

6. In combination, a link having a bifurcated end, axially alined spaced bearings in said bifurcated end, a split member trunnioned in said bearings and affording a tapered seat having its major axis normal to the axis of said bearings, a second link having a tapered end rotable in said seat and having line contact therewith and a spring mounted on said tapered end tending to urge the tapered member into contact with its seat and the split member into contact with the bearings.

7. A shock absorber linkage, comprising a link having a bifurcated end, axially alined spaced bearings in said bifurcated end, a split member trunnioned in said bearings affording a tapered seat intermediate said bearings having an axis normal to the axis of said bearings, a second link having a tapered end rotable in said seat and extending therebeyond, said seat and tapered end having different radii of curvature to provide line contact therebetween, a washer secured on the extended end of said tapered link and a spring mounted under compression on said extended end between said split member and washer.

8. A shock absorber linkage, comprising a yoke having alined openings, bearings in said openings, a split member trunnioned in said bearings and affording a tapered seat having a central axis normal to the axis of said bearings, the component surfaces of said seat being conical with axes eccentric of said central axis, a member having a conical end rotatably mounted in said seat and means tending to urge said conical end into line contact with said seat and said split member into surface contact with said bearings.

In testimony whereof I have hereunto subscribed my name at Detroit, Wayne County, Michigan.

GEORGE H. HUFFERD.